Jan. 24, 1928.  
J. BUCHLI  
1,656,902  
MOTOR DRIVEN RAIL VEHICLE  
Filed Dec. 23, 1924  
2 Sheets-Sheet 1

Inventor:  
Jacob Buchli

Jan. 24, 1928.    1,656,902
J. BUCHLI
MOTOR DRIVEN RAIL VEHICLE
Filed Dec. 23, 1924    2 Sheets-Sheet 2

Inventor:
Jacob Buchli
By his Atty.

Patented Jan. 24, 1928.

1,656,902

UNITED STATES PATENT OFFICE.

JACOB BUCHLI, OF WINTERTHUR, SWITZERLAND.

MOTOR-DRIVEN RAIL VEHICLE.

Application filed December 23, 1924, Serial No. 757,601, and in Switzerland December 29, 1923.

In rail-vehicles supported in the middle, for example three-axle rail-vehicles, it has already been proposed to make the middle axle movable in its axial direction and to connect the two outer axles pivotally to the middle one in such a manner that they will position themselves approximately radially when travelling along curves. It has also been proposed to make two-axle vehicles of long wheel-base with driving axles which are driven by means of Cardan shafts by motors rigidly attached to the vehicle body between the said driving axles. This proposed kind of drive, however, has the defect that the driving axles position themselves, when on curves, not radially but so that the wheel of the front axle on the inside of the curve leads in advance of the other.

According to my invention the one or more driving motors are arranged not on the vehicle body, but on a separate steering frame distinct from said body which frame is movable laterally in relation to said body and by which the two driving axles are adjusted as by a thill.

As compared with the constructions heretofore proposed such a drive has a number of important advantages. The driving axles are positively positioned radially on curves and run exceedingly quietly on straight tracks. Both the tires and the rails are preserved, the formation of grooves is avoided and curves are passed silently; also very small radii are possible with long wheel-bases. With a prescribed axle-load the useful total load can be increased because the weight of the motors is borne by a frame specially provided for them. The axle load of the driving axles may be reduced, when the points of support of the vehicle body are situated on thills connecting the driving axles with the steering frame. As in motor-cars all the gear parts can be enclosed oil-tight, so that waste of oil is avoided. Further, as in motor-cars, the axles can be driven by differential gears whereby loss of power is avoided, and since the motors lie in the longitudinal direction of the vehicle they can be constructed at a lower cost and more favorably, particularly they can be made for high speeds and provided with artificial ventilation and air-filters.

Figure 1:
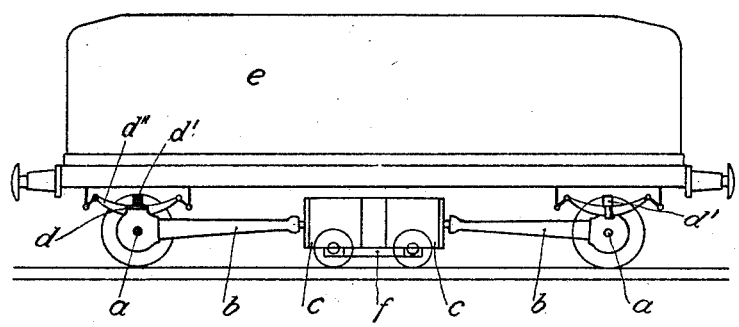
Figure 2:
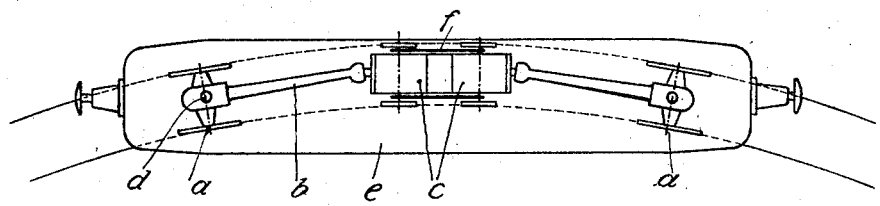
Figure 3:
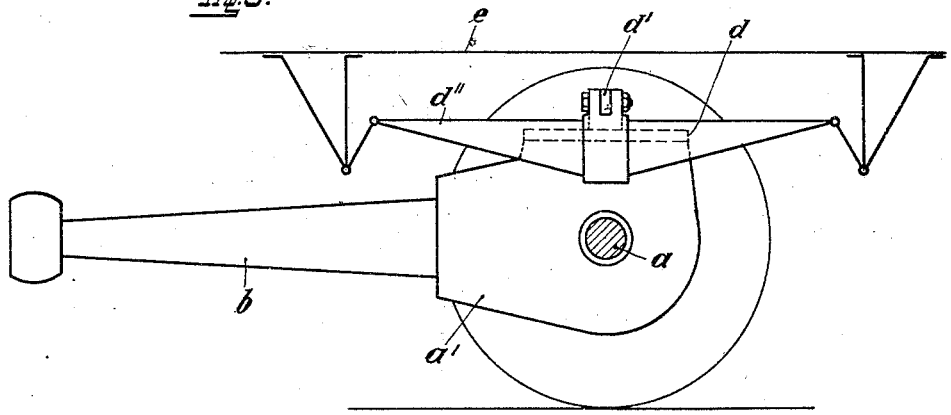
Figure 4:
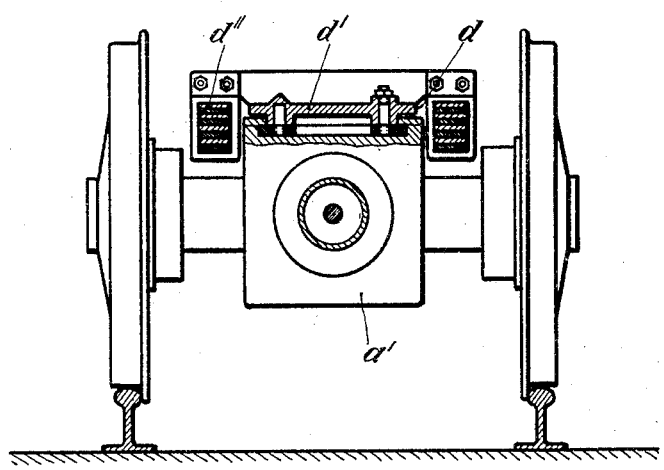

In the appended drawing, in which I have illustrated one embodiment of the invention by way of example:

Figures 1 and 2 are a side elevation and a top plan view, respectively, showing one arrangement of driving motors of a rail-vehicle according to my invention. Figs. 3 and 4 are detail views, drawn to a larger scale, showing the mounting of the axles.

Near the two ends of the vehicle are located the driving axles $a$, which are enclosed in the housings $a'$ and are driven by universal couplings $b$ each by means of an electric motor $c$. Instead of electric motors, other motors may of course be used, for example, internal-combustion, or Diesel engines. As shown in Figure 2, according to the invention the motors are not connected with the carriage body $e$, but are mounted on a separate chassis or steering frame $f$ having its own wheel-base and small wheels, which frame $f$ is free to move laterally under the vehicle body so that it can move to either side. Because of the provision of the universal couplings $b$ forming radius bars the axles $a$ are steered by the frame $f$. The carriage body $e$ is supported on the axles $a$ by means of a slide $d$, a truck bolster $d'$ and supporting springs $d''$ attached to the said truck bolster, such slide permitting longitudinal movement of the axles relative to the carriage body, and the said springs connected to the carriage body by a means permitting radial movement thereof. The latter may be driven in well-known manner by bevel gear and, if desired, by differential gear, not shown.

Besides the axles $a$ at least one axle of the frame $f$ may be driven. The two driving axles $a$ and in some cases the axles of the frame $f$ may be driven by a single motor carried by the latter. In some cases it will suffice to equip the frame $f$ with one single axle, but if two axles are too few then three or more may be provided.

I claim:—

1. In a motor-driven rail-vehicle of long wheel-base, the combination with the vehicle body and two driving axles, supporting said vehicle body, of a steering frame distinct from said vehicle body, and movable laterally in relation thereto and situated intermediate said axles, at least one motor mounted on said steering frame, and means operatively connecting said frame with said axles to steer the same in the manner of a thill.

2. In a motor-driven rail-vehicle of long wheel-base, the combination of a vehicle body, two axles, one near each end thereof, bogie slides, one for each axle, supporting said vehicle body thereon, a steering frame distinct from said body, and movable laterally in relation thereto and situated intermediate said axles, at least one motor mounted on said steering frame, means operatively connecting said motor with said axles to rotate the same, and means connecting said frame with said axles to steer the same in the manner of a thill.

3. The combination of parts as set forth in claim 1, in which said vehicle body is connected with said steering frame only indirectly.

4. In a motor-driven rail-vehicle of long wheel-base, the combination with the vehicle body and two driving axles, one near each end thereof, of a steering frame distinct from said vehicle body, and movable laterally in relation thereto and situated intermediate said axles, two motors mounted on said steering frame, means operatively connecting said steering frame with said axles to steer the same in the manner of a thill, and two driving connections connecting each one of said motors with each one of said axles for rotating the latter.

5. In a motor-driven rail-vehicle of long wheel-base, the combination with the vehicle body and two driving axles, one near each end thereof, supporting the same, of a steering frame distinct from the vehicle body, and movable laterally in relation thereto and situated intermediate said axles, at least one motor mounted on said steering frame and geared with said driving axles, driving means operatively connecting said motor with said driving axles for rotating the same and steering means operatively connecting said steering frame with said driving-axles to steer the same in the manner of a thill.

Signed at Winterthur this 11th day of December, 1924.

JACOB BUCHLI.